(12) United States Patent
Ito et al.

(10) Patent No.: US 8,582,880 B2
(45) Date of Patent: Nov. 12, 2013

(54) METHOD AND APPARATUS FOR CALCULATING FEATURES OF IMAGE DATA

(75) Inventors: Satoshi Ito, Tokyo (JP); Tomoki Watanabe, Tokyo (JP); Kentaro Yokoi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1133 days.

(21) Appl. No.: 12/536,703

(22) Filed: Aug. 6, 2009

(65) Prior Publication Data

US 2010/0034459 A1 Feb. 11, 2010

(30) Foreign Application Priority Data

Aug. 8, 2008 (JP) .................................. 2008-206007

(51) Int. Cl.
*G06K 9/00* (2006.01)
(52) U.S. Cl.
USPC ........................................................ 382/168
(58) Field of Classification Search
USPC .......... 382/103, 100, 162–165, 168–171, 181, 382/305, 224, 173; 348/43, 47, 48, 50, 148, 348/153; 708/203
See application file for complete search history.

(56) References Cited

U.S. PATENT DOCUMENTS

| 5,983,251 | A * | 11/1999 | Martens et al. | 708/203 |
| 6,263,103 | B1 * | 7/2001 | Freeman et al. | 382/173 |
| 6,532,301 | B1 * | 3/2003 | Krumm et al. | 382/170 |
| 7,760,940 | B2 * | 7/2010 | Terakawa | 382/170 |
| 8,160,296 | B2 * | 4/2012 | O'Hara et al. | 382/103 |
| 8,224,072 | B2 * | 7/2012 | Porikli et al. | 382/159 |
| 8,289,391 | B2 * | 10/2012 | Kiyohara et al. | 348/148 |
| 8,340,412 | B2 * | 12/2012 | Lang et al. | 382/165 |
| 8,340,420 | B2 * | 12/2012 | Smith et al. | 382/170 |

FOREIGN PATENT DOCUMENTS

JP 10-134186 5/1998

OTHER PUBLICATIONS

Chang et al., Object Recognition with Color Cooccurrence Histograms, IEEE Conference on Computer Vision and Pattern Recognition, Fort Collins, CO, Jun. 23-25, 1999.*
Rautkorpi, et al. A Novel Shape Feature for Image Classification and Retrieval. 2004 Proceedings of International Conference on Image Analysis and Recognition.
Shotton, et al. TextonBoost: Joint Appearance, Shape and Context Modeling for Multi-class Object Recognition and Segmentation. 2006 Proceeding of European Conference on Computer Vision.

* cited by examiner

*Primary Examiner* — Ishrat I Sherali
(74) *Attorney, Agent, or Firm* — Turocy & Watson, LLP (57) ABSTRACT

A feature extraction apparatus includes a pixel feature calculator configured to calculate a plurality of pixel features for each of pixels included in a plurality of pieces of image data; a co-occurrence frequency calculator configured to calculate co-occurrence frequencies of the pixel features by comparing the pixel features among corresponding pixels in the pieces of image data; and a co-occurrence frequency output unit configured to output the co-occurrence frequencies.

13 Claims, 6 Drawing Sheets

· IMAGES CAPTURED FROM MUTUALLY DIFFERENT VIEWPOINTS

FIG.4

TIME-SERIES IMAGES

FIG.5

- IMAGES OBTAINED BY USING SENSORS THAT HAVE MUTUALLY DIFFERENT CHARACTERISTICS

VISIBLE-LIGHT IMAGES     INFRARED IMAGES

- EXAMPLE IN WHICH TARGET IMAGE DATA REPRESENTS IMAGES OF PERSON

METHOD AND APPARATUS FOR CALCULATING FEATURES OF IMAGE DATA

CROSS-REFERENCE TO RELATED APPLICATIONS

This application is entitled to claim the benefit of priority based on Japanese Patent Application No. 2008-206007, filed on Aug. 8, 2008; the entire contents of which are incorporated herein by reference.

BACKGROUND OF THE INVENTION

1. Field of the Invention

The present invention relates to a feature extraction apparatus, a feature extraction method, an image processing apparatus, and a computer program product therefor.

2. Description of the Related Art

Techniques for extracting features from an image so as to recognize an object or the like have conventionally been known. For example, according to the feature area extraction method and the like described in Japanese Patent No. 3247305 (hereinafter, "Patent Document 1"), mutual correlations of gray-level values are calculated among mutually different images so that it is possible to extract a feature area by calculating a distribution of the mutual correlation values. As another example, a document (hereinafter, "Non-Patent Document 1") by Rami Rautkorpi and Jukka Iivarinen, "A Novel Shape Feature for Image Classification and Retrieval", in Proceedings of the International Conference on Image Analysis and Recognition, Lecture Notes in Computer Science (LNCS) 3211, Part I, pages 753-760, Porto, Portugal, Sep. 29 to Oct. 1, 2004 describes a technique for extracting features that are robust even in changes such as ones caused by illuminations, by using a co-occurrence matrix of intensity gradient directions. Further, Non-Patent Document 1 describes that this technique can be used for extracting features that are effective in texture classification. In this example, the co-occurrence matrix is a type of co-occurrence histogram.

To detect or recognize a specific target object, it is desirable to utilize information among mutually different images; however, the purpose of the technique disclosed in Patent Document 1 is to extract a feature area, although information among the mutually different images is taken into account. Thus, when this technique is used for object recognition, a problem arises where the level of performance is low because the technique is not intended for object recognition. Further, the technique disclosed in Non-Patent Document 1 uses a single image as a target. Thus, this technique does not take into account dealing with a plurality of images, such as images that change over time (e.g., images of walking motion).

SUMMARY OF THE INVENTION

According to one aspect of the present invention, a feature extraction apparatus includes a pixel feature calculator configured to calculate features for each pixel included in a plurality of pieces of image data; a co-occurrence frequencies calculator configured to calculate co-occurrence frequencies of the pixel features by comparing the pixel features among corresponding pixels in the pieces of image data; and a co-occurrence frequencies output unit that outputs the co-occurrence frequencies.

According to another aspect of the present invention, a feature extraction method includes calculating pixel features for each of pixels included in a plurality of pieces of image data; calculating co-occurrence frequencies of the pixel features by comparing the pixel features among corresponding pixels in the pieces of image data; and outputting the co-occurrence frequencies.

A computer program product according to still another aspect of the present invention causes a computer to perform the method according to the present invention.

DETAILED DESCRIPTION OF THE INVENTION

Exemplary embodiments of the present invention will be explained, with reference to the accompanying drawings.

Figure 1:
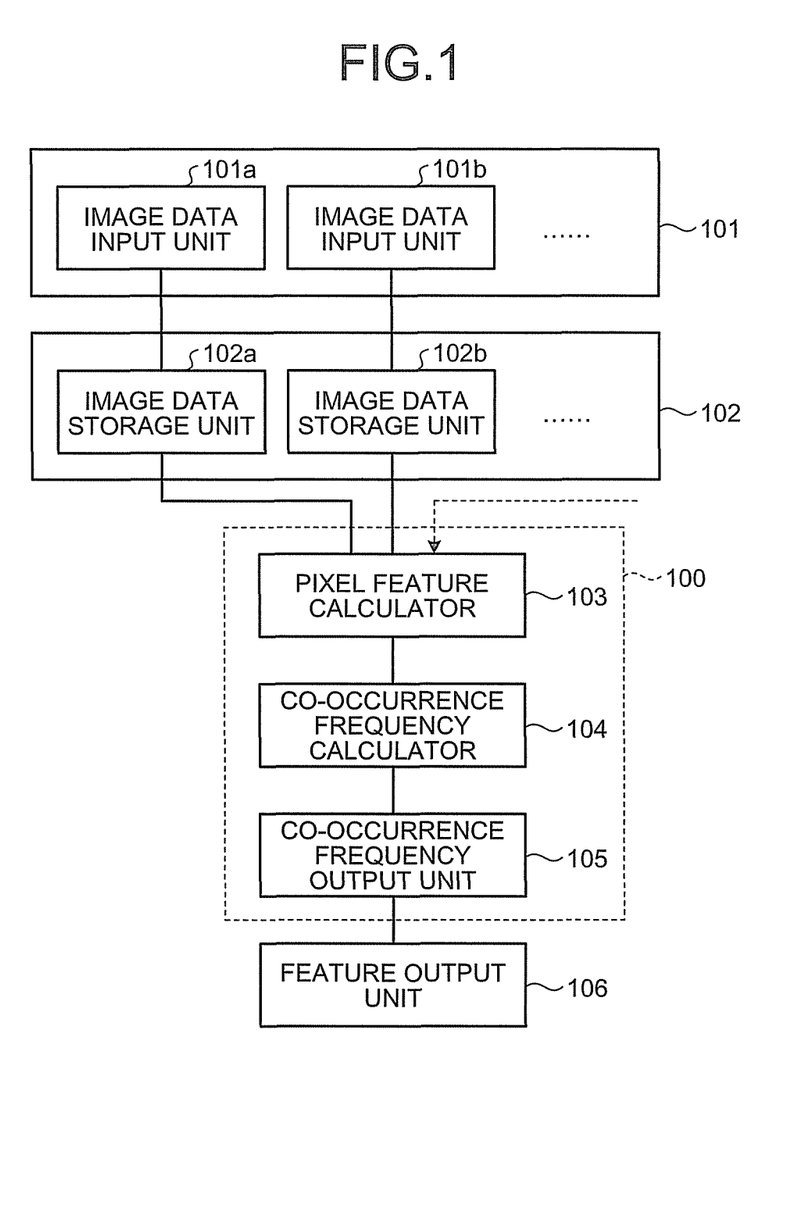
FIG. 1 shows a feature extraction apparatus according to an embodiment of the present invention.

FIG. 1 shows a feature extraction apparatus according to an embodiment of the present invention. A feature extraction apparatus 100 includes a pixel feature calculator 103, a co-occurrence histogram calculator 104, and a co-occurrence histogram output unit 105. The feature extraction apparatus 100 may be connected to an image input unit 101, a storage unit 102, and a feature output unit 106, as explained later.

The image input unit 101 includes an imaging device such as an image sensor and obtains a plurality of pieces of image data that are mutually different. The image input unit 101 includes, for example, an image data input unit 101a and an image data input unit 101b that are connected to mutually different imaging devices, respectively. The number of image data input units being included does not necessarily have to be two.

The storage unit 102 stores therein the pieces of image data that have been obtained by the image input unit 101. The storage unit 102 includes, for example, an image data storage unit 102a and an image data storage unit 102b. The image data storage unit 102a stores therein the piece of image data that has been input through the image data input unit 101a. The image data storage unit 102b stores therein the piece of image data that has been input through the image data input unit 101b. The number of image data storage units being included does not necessarily have to be two.

The pixel feature calculator 103 calculates one or more pixel features for each of the pieces of image data that are stored in the storage unit 102. The pixel feature calculator 103 may calculate one or more values for a plurality of mutually different pixel features. Alternatively, the pixel feature calculator 103 may calculate a plurality of values for one pixel feature. Each of the pixel features is, for example, a gray-level value of the pixel or an intensity gradient direction of the pixel.

The co-occurrence histogram calculator 104 calculates a co-occurrence frequencies of pixel features for each set of corresponding pixels among the pieces of image data. For example, in the mutually different pieces of image data, a set of pixels that have the same coordinates may be used as the set of corresponding pixels. Alternatively, in the mutually different pieces of image data, when a first pixel is contained in a first piece of image data, whereas a second pixel is positioned away, by a predetermined distance, from a pixel that has the same coordinates as the coordinates of the first pixel and is contained in a second piece of image data, the first pixel and the second pixel may be used as the set of corresponding pixels. The predetermined distance may be determined according to, for example, a relationship among the mutually different pieces of image data.

The co-occurrence histogram output unit 105 outputs the co-occurrence frequencies that has been calculated to the feature output unit 106, as a co-occurrence histogram.

Figure 2:
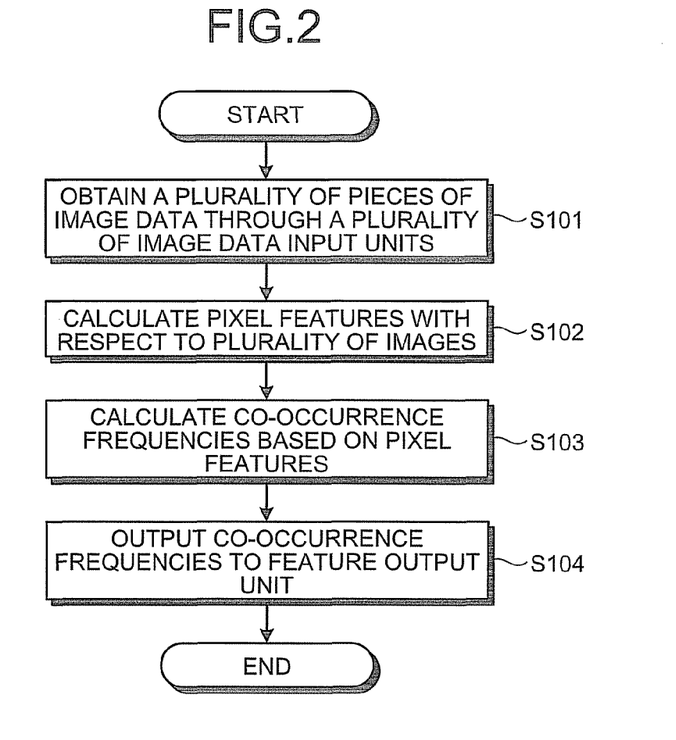
FIG. 2 is a flowchart of a process for outputting co-occurrence histograms.

FIG. 2 is a flowchart for explaining a process for outputting the co-occurrence histogram. At step S101, N pieces of image data $I1(r), \ldots, IN(r)$ (where r is a variable expressing image coordinates) are obtained through the image data input units 101a, 101b, and so on the total quantity of which is N (where $N \geq 2$). More specifically, one piece of image data is obtained through each of the image data input units. Another arrangement is acceptable in which a plurality of pieces of image data are sequentially obtained through one image data input unit. The pieces of image data that have been obtained are stored into the storage unit 102.

Figure 3:
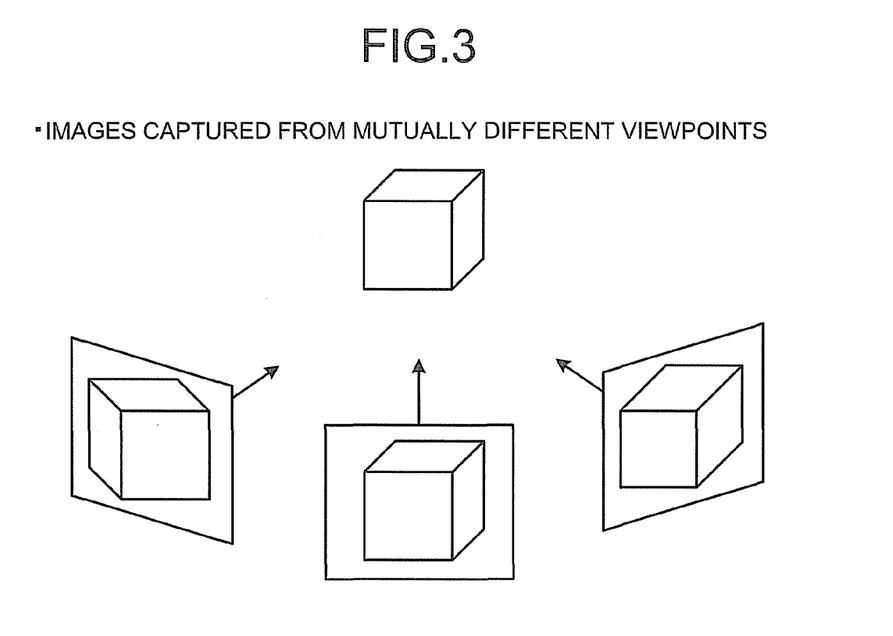
FIG. 3 shows images captured from mutually different viewpoints, respectively.
Figure 4:
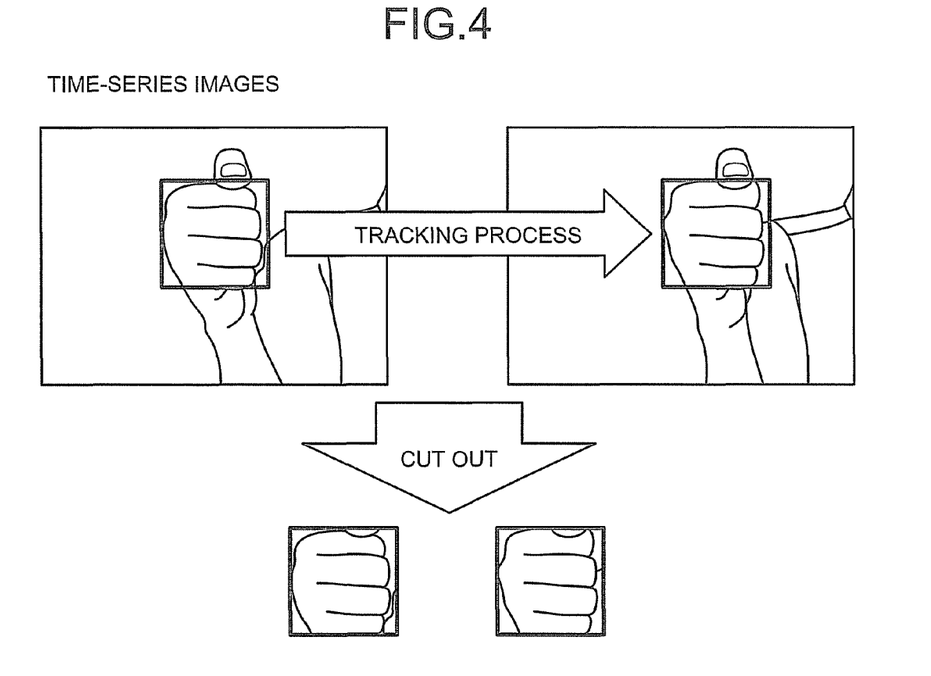
FIG. 4 shows time-series images.
Figure 5:
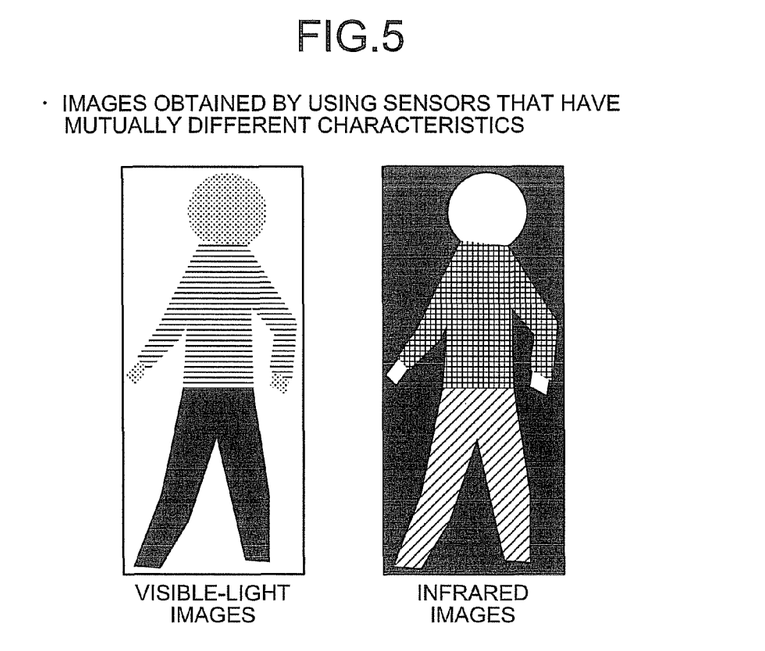
FIG. 5 shows images obtained by using a plurality of imaging devices having mutually different characteristics, respectively.

FIGS. 3 to 5 show the pieces of image data that are obtained. FIG. 3 shows images that are captured from mutually different viewpoints. An arrangement is acceptable in which, for example, a stereo matching technique is applied to the images having the mutually different viewpoints so that a correspondence relationship among the images can be calculated, and areas that are judged to contain mutually the same target object are cut out and obtained by the image input unit 101.

FIG. 4 shows time-series images. The time-series images denote a plurality of images that have sequentially been captured at predetermined time intervals such as, for example, moving images. For example, an arrangement is acceptable in which images of an object contained in the time-series images are tracked so that images obtained by cutting out the areas of the tracked object are obtained by the image input unit 101.

FIG. 5 shows images that have been obtained by using a plurality of imaging devices that have mutually different characteristics, respectively. Examples of images that can be obtained by using imaging devices include: visible-light images; infrared images; x-ray images; ultrasound images; and range images. It is also acceptable to generate an image from output values of a sensor such as a tactile sensor and use the generated image as an image to be obtained.

The images that are obtained by the image input unit 101 may be images to which a filtering process has been applied in advance. The filtering processes that are applied to the plurality of pieces of image data may be mutually the same or mutually different. Examples of the filtering processes include: an edge extraction process; a horizontal (left-right) flipping process; a smoothing process; and an affine transformation process. It is acceptable to use any transformation process as long as the process is applied to an image so that a different image is output. In the case where the image sizes of the plurality of images that are obtained are different from one another, an arrangement is acceptable in which the image sizes are equalized by applying a normalizing process to the images.

At step S102, the pixel feature calculator 103 calculates, with respect to the N pieces of image data $I1(r), \ldots, IN(r)$ that have been obtained at step S101, pixel features $f1(r), \ldots, fN(r)$ that correspond to each one of the pixels.

It is preferable if the pixel features calculated by the pixel feature calculator 103 are discrete values. With this arrangement, it is possible to obtain pixel features that make it easier for the co-occurrence histogram calculator 104 to calculate the co-occurrence frequencies. In the case where the pixel features are continuous values, the pixel feature calculator 103 quantizes the pixel features so as to obtain discrete values.

For example, each of the pixel features is a gray-level value of the pixel or a value of the intensity gradient direction of the pixel. Alternatively, each of the pixel features may be a cluster number to which the pixel belongs, the cluster number being obtained by clustering the gray-level values according to a k-means clustering method or the like. As another example, instead of clustering the gray-level values, it is acceptable to apply a clustering process to a gray-level pattern including an area near the pixel. As yet another example, each of the pixel features may be a category number to which the pixel belongs, the category number being assigned by using a recognition method described in a document (hereinafter, "Non-Patent Document 2") by J. Shotton et al., "Text on Boost: Joint Appearance, Shape and Context Modeling for Multi-Class Object Recognition and Segmentation", in Proceedings of the European Conference on Computer Vision (2006), pp. 1-15.

The image data $Ii(r)$ may represent a multi-channel image such as a color image, instead of a gray-level image. The pixel feature $fi(r)$ corresponding to the image data $Ii(r)$ does not necessarily have to be calculated by using only the image data $Ii(r)$. For example, an arrangement is acceptable in which the pixel feature $fi(r)$ is calculated by using all the pieces of image data $I1(r), \ldots, IN(r)$. More specifically, a difference between two pieces of image data may be used as a pixel feature. As another example, an image representing an average value of a plurality of pieces of image data may be used as a pixel feature.

Further, the pixel features $f1(r), \ldots, fN(r)$ do not necessarily have to be pixel features of the same type. More specifically, for example, an arrangement is acceptable in which $f1(r)$ is a gray-level value, whereas $f2(r)$ is a value of the intensity gradient direction.

At step S103, the co-occurrence histogram calculator 104 calculates a co-occurrence histogram $h(a1, \ldots, aM; i1, \ldots, iM, d1, \ldots, dM)$, based on the pixel features $f1(r), \ldots, fN(r)$ that have been calculated at step S102. In this situation, $i1, \ldots, iM, d1, \ldots, dM$ are fixed parameters, whereas M is a natural number that is 2 or larger.

The fixed parameters $i1, \ldots, iM$ indicate pixel feature numbers being used. In other words, these fixed parameters indicate that the pixel features $fi1(r), \ldots, fiM(r)$ should be used. Each of the fixed parameters $d1, \ldots, dM$ indicates a displacement from the reference pixel r.

More specifically, the co-occurrence histogram $h(a1, \ldots, aM; i1, \ldots, iM, d1, \ldots, dM)$ is a tensor of rank M and expresses co-occurrence frequencies of combinations of the pixel features. It is assumed that a pixel feature fi represents each of integer values from 0 to Li−1, it is possible to obtain the co-occurrence histogram h(a1, ..., aM; i1, ..., iM, d1, ..., dM) by using Expression (1) shown below, where the co-occurrence histogram has as many values as Li1× Li2× ... ×LiM in total:

$$h(a_1, \ldots, a_M; i_1, \ldots, i_M, d_1, \ldots, d_M) = \sum_{r \in D} \prod_{j=1}^{M} \left( f_{i_j}(r + d_j), a_j \right) \quad (1)$$

$$\text{for } a_j = 0, \ldots, L_{i_j} - 1 \quad (j = 1, \ldots, M)$$

$$\text{where } i_j \in \{1, \ldots, N\}, d_j \in Z^2 \quad (j = 1, \ldots, M)$$

In Expression (1), D denotes an area in the image, whereas Z denotes a set of integers.

Further, it is possible to express the function g by using Expression (2) shown below:

$$g(a, b) = \begin{cases} 1 & \text{if } a = b \\ 0 & \text{otherwise} \end{cases} \quad (2)$$

Next, differences between the co-occurrence histogram expressed by using Expression (1) and conventional techniques will be explained.

Figure 6:
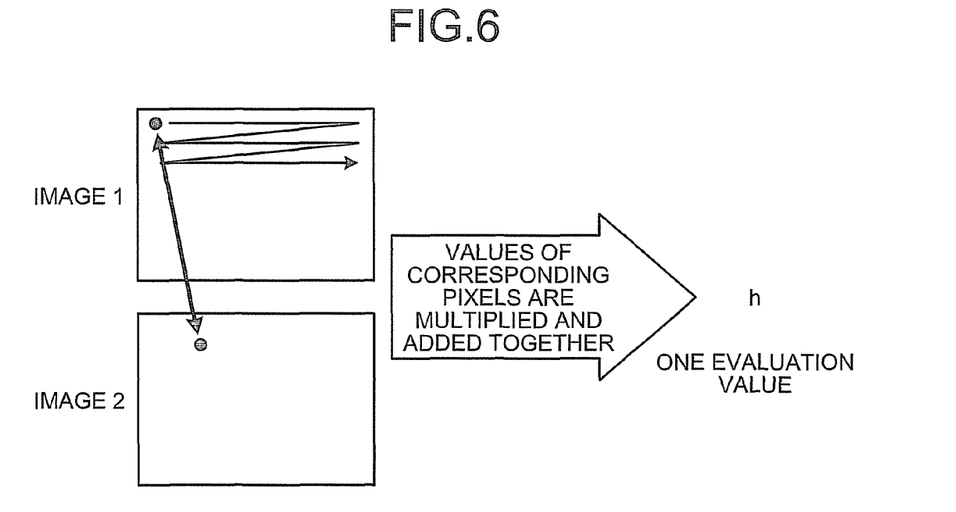
FIG. 6 shows an example in which a pixel feature is calculated by using correlations between a plurality of pieces of image data.

FIG. 6 shows a pixel feature of image data that has been obtained according to a conventional technique. In FIG. 6, an example is explained in which correlations between a plurality of pieces of image data are used. According to the technique related to the feature area extraction method and the like described in Patent Document 1, a pixel feature as shown in FIG. 6 is obtained. In the example shown in FIG. 6, a correlation value in which the relationship between the two pieces of image data is taken into account is calculated; however, because only one evaluation value is calculated with respect to one displacement d from the pixel r, it is not possible to express the targeted information in a sufficient manner.

Figure 7:
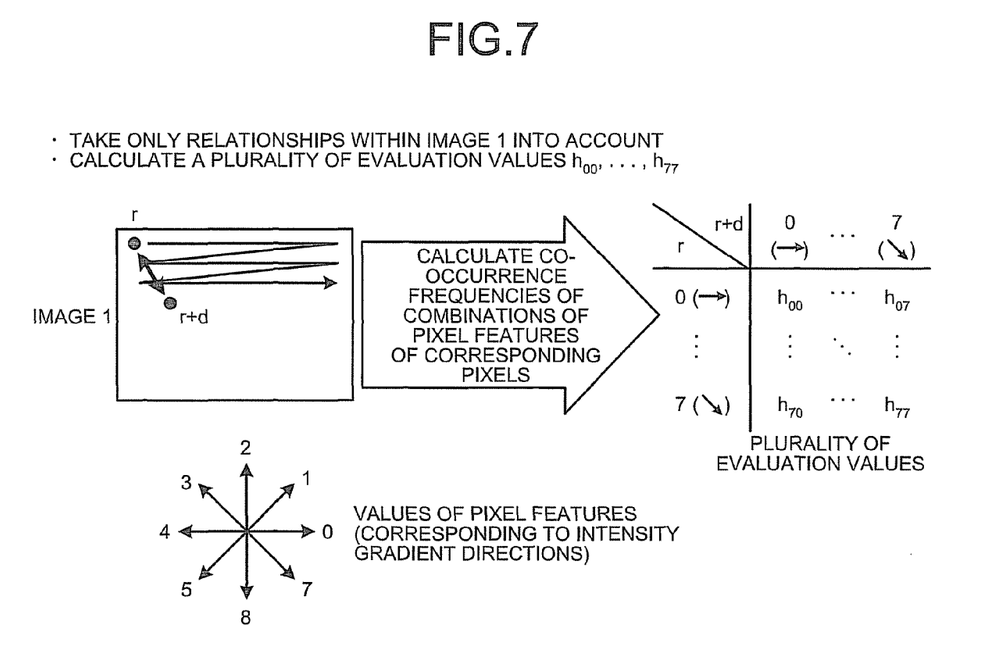
FIG. 7 shows an example in which pixel features are obtained from within one piece of image data.

FIG. 7 shows features of image data that have been obtained according to another conventional technique. In FIG. 7, an example is explained in which pixel features are obtained from within one piece of image data. According to the technique described in Non-Patent Document 1, features as shown in FIG. 7 are obtained. As shown in FIG. 7, a plurality of evaluation values are calculated with respect to one displacement d. More specifically, as many evaluation values as 8×8=64 are calculated. As a result, it is possible to obtain features that express the targeted information in a sufficient manner.

However, the method shown in FIG. 7 is applied to the one piece of image data. Thus, extracting features while taking into account the relationship among the images when a plurality of pieces of image data are given is not considered in this method.

Figure 8:
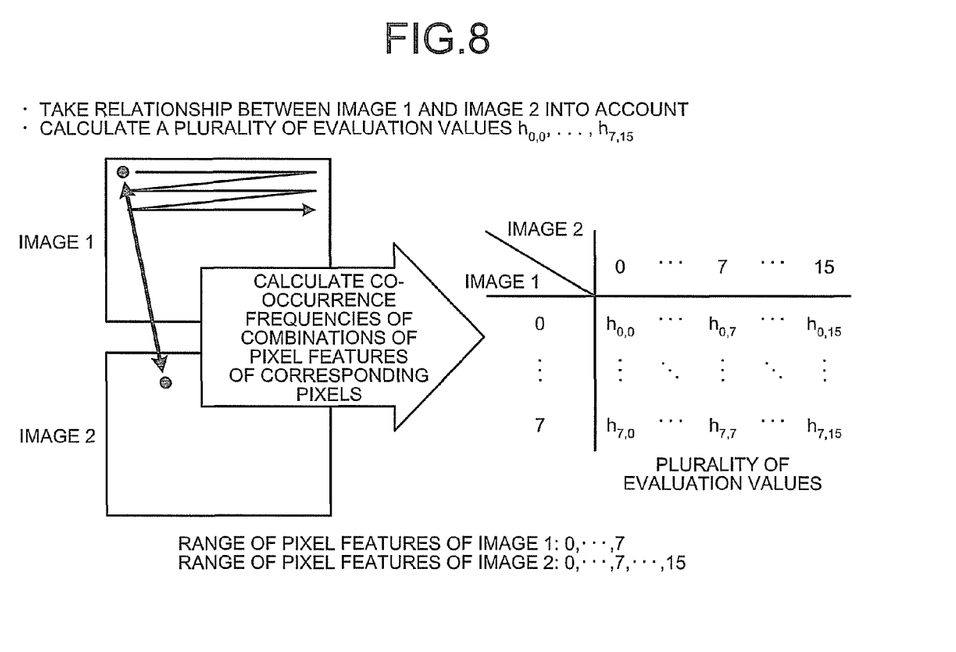
FIG. 8 shows features of images extracted by the feature extraction apparatus according to the embodiment of the present invention.

FIG. 8 shows features of images that are extracted by the feature extraction apparatus according to the present embodiment. The processes shown in FIG. 8 are performed by the pixel feature calculator 103 and the co-occurrence histogram calculator 104.

In the example shown in FIG. 8, for each set of corresponding pixels between an image 1 and an image 2, co-occurrence frequencies of combinations of the pixel features are calculated. Thus, in the example shown in FIG. 8, the problems of the examples shown in FIGS. 6 and 7 are solved, while the advantageous characteristics of those are maintained. In other words, it is possible to express the targeted information in a sufficient manner, while taking into account the relationship between the plurality of images.

In the example shown in FIG. 8, the pixel features used for calculating the co-occurrence relationship may be different from one another. Accordingly, the number of evaluation values corresponding to one displacement d from the pixel r does not necessarily have to be a square number. For example, in the example shown in FIG. 8, as many evaluation values as 8×16=128 are obtained.

In Expression (1), "dj" is a vector that expresses a relative displacement with respect to the position r in the image. Thus, one of the vectors d1, ..., dM may be a zero vector. Alternatively, two or more of the vectors d1, ..., dM may each be a zero vector. Further, r+dj does not necessarily have to be contained in the area D.

Figure 9:
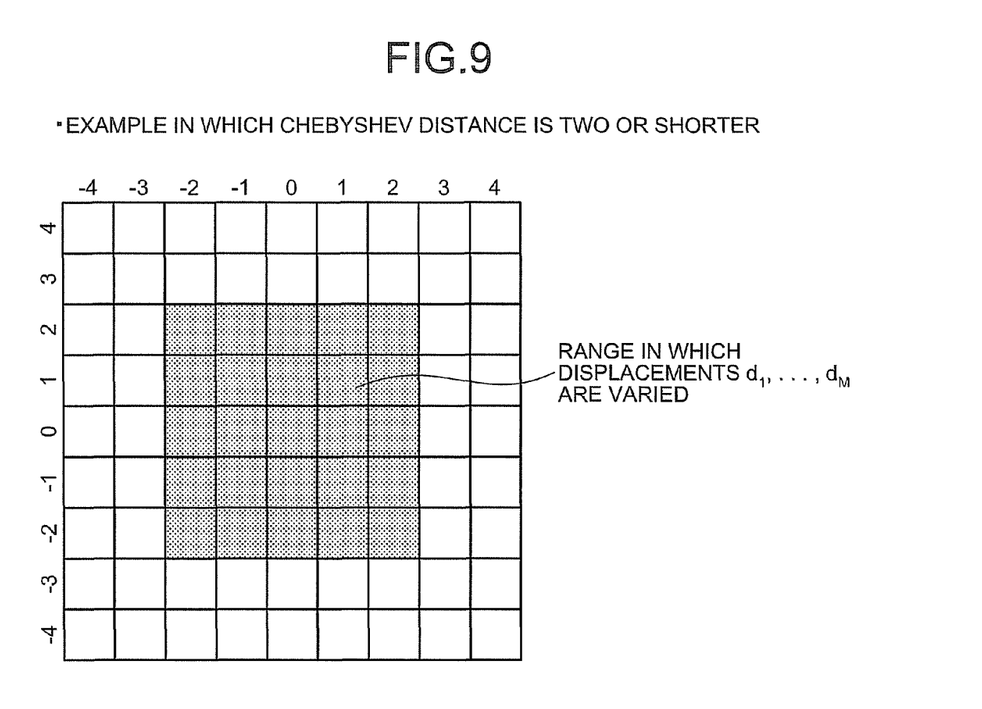
FIG. 9 shows a process for calculating a plurality of co-occurrence histograms.

Furthermore, another arrangement is acceptable in which a plurality of co-occurrence histograms are calculated by varying the fixed parameters i1, ..., iM, and d1, ..., dM. FIG. 9 shows a process for calculating a plurality of co-occurrence histograms. In the example shown in FIG. 9, the plurality of co-occurrence histograms are calculated by varying d1, ..., dM within a range where the Chebyshev distance from the origin is equal to or shorter than a predetermined length. Another arrangement is acceptable in which a Manhattan distance or a Euclid distance is used, instead of the Chebyshev distance. Yet another arrangement is acceptable in which d1, ..., dM are configured with arbitrary vectors.

As for the parameters i1, ..., iM, for example, in the case where N=4 and M=3 are satisfied, it is acceptable to use all the combinations such as (i1, i2, i3)=(1, 2, 3) (2, 3, 4), (3, 4, 1), (4, 1, 2). Further, it is acceptable to add the following in such a manner that duplications are allowed: (i1, i2, i3)=(1, 1, 1), (1, 1, 2), (1, 1, 3), (1, 1, 4), (2, 2, 1), (2, 2, 2), (2, 2, 3), (2, 2, 4), (3, 3, 1), (3, 3, 2), (3, 3, 3), (3, 3, 4), (4, 4, 1), (4, 4, 2), (4, 4, 3), (4, 4, 4).

At step S104, the co-occurrence histogram output unit 105 outputs the co-occurrence histogram that has been calculated at step S103 to the feature output unit 106, as the features of the obtained image data.

As explained above, according to the feature extraction apparatus according to the present embodiment, the plurality of pixel features are calculated with respect to the plurality of pieces of image data, so that it is possible to calculate the co-occurrence frequencies of the combinations of the plurality of pixel features that have been calculated. As a result, it is possible to extract the features in which the relationships among the plurality of images are utilized in a sufficient manner. By using the features obtained in this manner, it is possible to detect an object or recognize an object with a higher level of precision than when features extracted from only one image are used.

Figure 10:
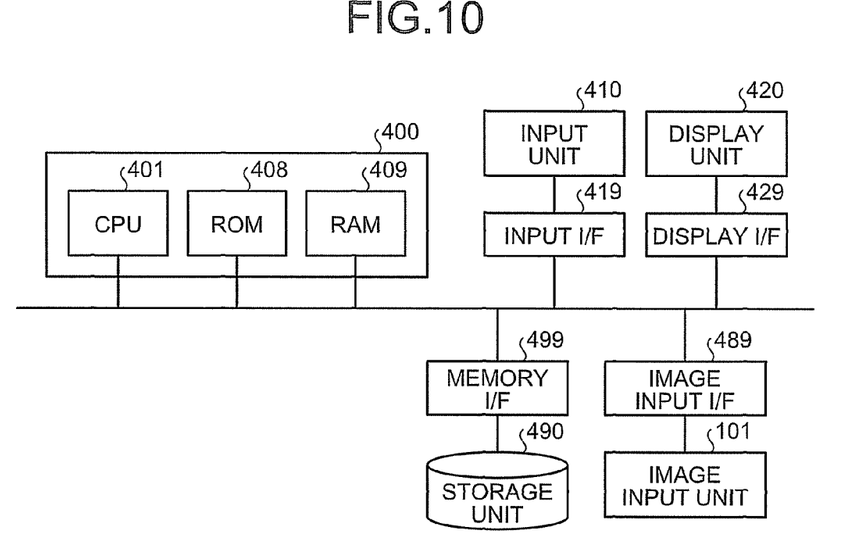
FIG. 10 shows a computer that realizes a feature extraction apparatus according to an embodiment of the present invention.

FIG. 10 shows an image processing apparatus configured with, for example, a computer that realizes functions of the feature extraction apparatus 100 according to an embodiment of the present invention. The computer shown in FIG. 10 includes, for example, a main processing unit 400, an input unit 410, a display unit 420, a storage unit 490, an input interface (I/F) 419, a display I/F 429, an image input I/F 489, and a memory I/F 499.

The main processing unit 400 realizes the functions of the feature extraction apparatus 100 by causing the computer to execute a computer program (hereinafter, the "program") for performing the processes shown in FIG. 2. The main processing unit 400 includes, for example, a Central Processing Unit (CPU) 401, a Read-Only Memory (ROM) 408, and a Random Access Memory (RAM) 409. The CPU 401 controls various devices included in the computer by executing the program. The ROM 408 stores therein, for example, the program and the parameters and supplies the program and the parameters to the CPU 401. The RAM 409 serves as, for example, a working memory while the CPU 401 executes the program. The RAM 409 may also serve as the storage unit 102 shown in FIG. 1.

The input unit 410 is, for example, an input device such as a keyboard and/or a mouse. Instructions to the computer are input to the input unit 410. The display unit 420 displays, for example, results of processes performed by the CPU 401.

The input I/F 419, the display I/F 429, the memory I/F 499, and the image input I/F 489 respectively serve as interfaces when the input unit 410, the display unit 420, the storage unit 490, and the image input unit 101 are connected to the main processing unit 400 via a bus.

The image data that is processed by the feature extraction apparatus 100 according to the present embodiment is, for example, obtained by the image input unit 101 or input to the feature extraction apparatus 100 from the outside thereof via a network. Thus, the image processing apparatus according to the present embodiment may include the image input unit 101 or may be connected to an external image data input unit in such a manner that communication is allowed therebetween. Another arrangement is acceptable in which the image data processed by the feature extraction apparatus 100 according to the present embodiment is read from, for example, a recording medium inserted in a driving device (not shown).

The features of the image data that have been extracted by the feature extraction apparatus 100 according to the present embodiment are output from, for example, the display unit 420 or a network. Alternatively, the features of the image data that have been extracted by the feature extraction apparatus 100 according to the present embodiment may be, for example, recorded onto a recording medium inserted in a driving unit or recorded into the storage unit 490.

Instead of being stored in nonvolatile storage devices such as the ROM 408 and the storage unit 490, the program for the feature extraction apparatus 100 shown in FIG. 1 may be recorded onto a recording medium such as a compact disk (CD) or a Digital Versatile Disk (DVD) so that, when the recording medium is inserted into a driving unit, the computer reads and executes the program.

The program executed by the feature extraction apparatus according to the present embodiment is provided as a computer program product as being recorded on a computer-readable recording medium such as a Compact Disk Read-Only Memory (CD-ROM), a flexible disk (FD), a Compact Disk Recordable (CD-R), a Digital Versatile Disk (DVD), in a file that is in an installable format or an executable format.

The exemplary embodiments to implement the present invention are explained above; however, the present invention is not limited to these exemplary embodiments. It is possible to apply modifications to the present invention without departing from the gist thereof.

Figure 11:
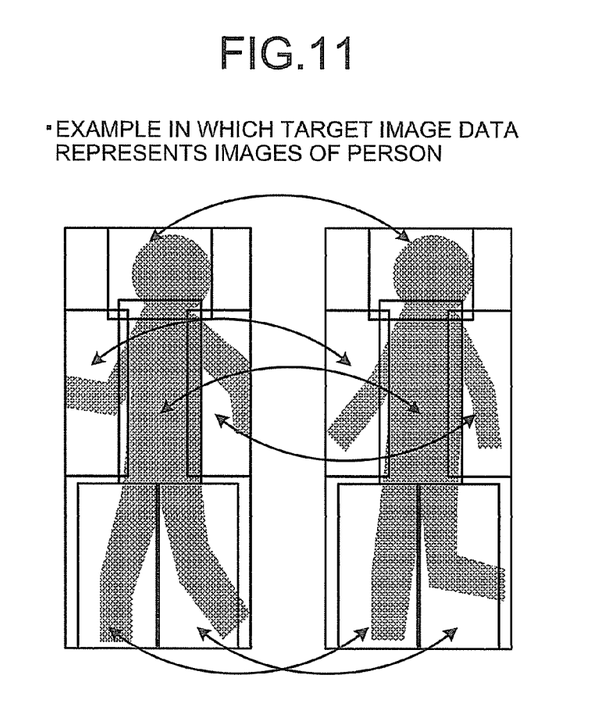
FIG. 11 shows an example in which a plurality of areas are set in one piece of image data.

For example, instead of setting the one area D in the image for which the co-occurrence histogram is calculated, it is acceptable to set a plurality of areas D in the image so that a co-occurrence histogram is calculated for each of the areas D. More specifically, for example, in the case where a target image depicts a pedestrian, it is possible to extract more detailed features by setting areas of, as shown in FIG. 11, leg portions, a trunk portion, arm portions, and a head portion.

Another arrangement is acceptable in which pixel features $f1(r), \ldots, fT(r)$ the total quantity of which is T (where T≠N) are calculated from the N pieces of image data $I1(r), \ldots, IN(r)$ that have been obtained. For example, in the case where the pieces of image data $I1(r), \ldots, IN(r)$ represent time-series images, and a difference image of any two images that are temporally adjacent to each other is used as a pixel feature, as many difference images as "N−1" are generated. Thus, the number of pixel features that are calculated can be expressed as T=N−1.

Further, it is possible to calculate as many pixel features as T (where T>N), by using a plurality of pixel features. For example, by using two directions as pixel features, such as a direction of the intensity value calculated using a first-order derivative (i.e., a intensity gradient direction) and a direction of the intensity value calculated using a second-order derivative, it is possible to calculate as many pixel features as T=2N. In this situation, the co-occurrence histogram calculated by the co-occurrence histogram calculator 104 can be expressed by using Expression (3) below, which is obtained by replacing "N" in Expression (1) with T.

$$\left.\begin{array}{l} h(a_1, \ldots, a_M; i_1, \ldots, i_M, d_1, \ldots, d_M) = \sum_{r \in D} \prod_{j=1}^{M} g(f_{i_j}(r + d_j), a_j) \\ \text{for } a_j = 0, \ldots, L_{i_j} - 1 \quad (j = 1, \ldots, M) \\ \text{where } i_j \in \{1, \ldots, T\}, d_j \in Z^2 \quad (j = 1, \ldots, M) \end{array}\right\} \quad (3)$$

According to an aspect of the present invention, it is possible to detect or recognize a target object in an appropriate manner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A feature extraction apparatus, comprising:
    a pixel feature calculator configured to calculate pixel features for each pixel included in a plurality of pieces of image data;
    a co-occurrence frequency calculator configured to calculate co-occurrence frequencies of the pixel features by comparing the pixel features among corresponding pixels belonging to at least two images in the pieces of image data; and
    a co-occurrence frequency output unit configured to output the co-occurrence frequencies.

2. The apparatus according to claim 1, wherein the co-occurrence frequencies are represented by a co-occurrence histogram.

3. The apparatus according to claim 1, wherein
    the pieces of image data are obtained by capturing images from mutually different viewpoints, respectively, and
    the co-occurrence frequency calculator calculates the co-occurrence frequencies of the pixel features calculated from the pieces of image data obtained by capturing the images from the mutually different viewpoints, respectively.

4. The apparatus according to claim 1, wherein
    the pieces of image data are obtained by capturing images at mutually different times, respectively, and
    the co-occurrence frequency calculator calculates the co-occurrence frequencies of the pixel features calculated from the pieces of image data obtained by capturing the images at the mutually different times, respectively.

5. The apparatus according to claim 1, wherein the co-occurrence frequency calculator calculates the co-occurrence frequencies of the pixel features calculated from the pieces of image data obtained by using imaging devices having mutually different characteristics, respectively.

6. The apparatus according to claim 1, wherein the co-occurrence frequency calculator brings a first pixel included in a first piece of image data being one of the pieces of image data into correspondence with a second pixel, the second pixel being positioned away, by a predetermined distance, from a pixel that has same coordinates as coordinates of the first pixel and is included in a second piece of image data being another one of the pieces of image data.

7. The apparatus according to claim 6, wherein the co-occurrence frequency calculator brings the first pixel into correspondence with the second pixel in the pieces of image data, for each of a plurality of predetermined distances.

8. The apparatus according to claim 1, wherein the co-occurrence frequency calculator sets an area in each of the pieces of image data and calculates the co-occurrence frequencies for each of corresponding areas in the pieces of image data.

9. The apparatus according to claim 8, wherein the co-occurrence frequency calculator sets a plurality of areas in one of the pieces of image data and calculates the co-occurrence frequencies for each of corresponding areas in the pieces of image data.

10. The apparatus according to claim 1, wherein each of the pixel features is at least one of a value of an intensity gradient direction and a pixel gray-level value.

11. An image processing apparatus comprising:
an image input unit configured to obtain the pieces of image data; and
the feature extraction apparatus according to claim 1.

12. A computer-implemented feature extraction method comprising:
calculating pixel features for each of pixels included in a plurality of pieces of image data;
calculating co-occurrence frequencies of the pixel features by comparing the pixel features among corresponding pixels belonging to at least two images in the pieces of image data; and
outputting the co-occurrence frequencies.

13. A computer program stored on a computer-readable medium for causing a computer to perform an instruction, the instruction comprising:
calculating pixel features for each of pixels included in a plurality of pieces of image data;
calculating co-occurrence frequencies of the pixel features by comparing the pixel features among corresponding pixels belonging to at least two images in the pieces of image data; and
outputting the calculated co-occurrence frequencies.

* * * * *